US012381493B2

(12) United States Patent
Shimada

(10) Patent No.: US 12,381,493 B2
(45) Date of Patent: Aug. 5, 2025

(54) VIBRATION-TYPE ACTUATOR, AND OPTICAL APPARATUS AND ELECTRONIC APPARATUS INCLUDING THE SAME

(71) Applicant: CANON KABUSHIKI KAISHA, Tokyo (JP)

(72) Inventor: Akira Shimada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 730 days.

(21) Appl. No.: 17/706,425

(22) Filed: Mar. 28, 2022

(65) Prior Publication Data

US 2022/0321031 A1 Oct. 6, 2022

(30) Foreign Application Priority Data

Mar. 31, 2021 (JP) ................................ 2021-059042

(51) Int. Cl.
*H02N 2/10* (2006.01)
*G02B 7/09* (2021.01)

(52) U.S. Cl.
CPC ............. *H02N 2/103* (2013.01); *G02B 7/09* (2013.01)

(58) Field of Classification Search
CPC . G02B 7/09; G02B 7/08; G02B 7/026; G02B 13/001; G02B 7/022; G03B 13/36
USPC .................................. 359/824, 819, 822, 823
See application file for complete search history.

(56) References Cited

U.S. PATENT DOCUMENTS

| 2016/0020710 A1* | 1/2016 | Oda ........................ H02N 2/026 310/323.01 |
| 2016/0127623 A1* | 5/2016 | Shimada .................. G02B 7/10 348/360 |
| 2016/0352255 A1* | 12/2016 | Noto ..................... H02N 2/0055 |
| 2017/0317614 A1* | 11/2017 | Shiono .................. H02N 2/026 |
| 2019/0245460 A1* | 8/2019 | Yamasaki .............. H02N 2/004 |

FOREIGN PATENT DOCUMENTS

| JP | 2008172995 A | 7/2008 |
| JP | 2019140764 A | 8/2019 |
| JP | 2021040374 A | 3/2021 |

* cited by examiner

*Primary Examiner* — William R Alexander
*Assistant Examiner* — MacKenzi Waddell
(74) *Attorney, Agent, or Firm* — Canon U.S.A., Inc. IP Division

(57) ABSTRACT

A vibration-type actuator includes a vibrator, a contact member, a ball, and a base table having a third guide. The vibrator has an elastic member and an energy conversion element. The contact member is fixed to the base table, contacts the elastic member, and extends in a predetermined direction. The vibrator and the contact member are driven along the predetermined direction due to a vibration generated by a voltage applied to the energy conversion element. A first guide provided on the contact member extends in the predetermined direction and a second guide that is connected with the vibrator faces the first guide and moves integrally with the vibrator. The ball is held between the first guide and the second guide rollably in the predetermined direction. The second guide extends in the predetermined direction and includes a fitting projection portion loosely fitted to a groove portion provided on the third guide.

17 Claims, 6 Drawing Sheets

MODE A

MODE B

VIBRATION-TYPE ACTUATOR, AND OPTICAL APPARATUS AND ELECTRONIC APPARATUS INCLUDING THE SAME

BACKGROUND

Field

The present disclosure relates to a vibration-type actuator, and an optical apparatus and an electronic apparatus including the vibration-type actuator.

Description of the Related Art

As a vibration wave motor (a vibration-type actuator) using an electro-mechanical energy conversion element such as a piezoelectric element, variously-configured apparatuses are known. One known example is a vibration wave motor including a driven member (a contact member), a vibrator including two protrusion portions on a surface of an elastic member shaped like a flat plate and also including a piezoelectric element joined to the back surface of the elastic member, and a pressing member for bringing the two protrusion portions and the contact member into pressure contact with each other. The back surface of the elastic member here refers to a surface where the protrusion portions, which will be described below, are not formed. Hereinafter, the driven member will also be referred to as a "contact member".

This vibration wave motor generates an elliptic motion or a circular motion at the tips of the two protrusion portions in a plane including a direction connecting the two protrusion portions and a direction in which the protrusion portions protrude by applying a predetermined alternating-current voltage (hereinafter will also be referred to as a "driving voltage") to the electro-mechanical energy conversion element. As a result, the vibration wave motor causes the contact member to receive a frictional driving force from the two protrusion portions (the vibrator), thereby allowing the vibrator and the contact member to relatively move (hereinafter will also be referred to as "having a relative movement") in the direction connecting the two protrusion portions.

Downsizing of an optical apparatus or an electronic apparatus with this vibration wave motor mounted therein requires downsizing of the vibration wave motor itself. A linear motion-type vibration wave motor commonly employs a guide unit including a rolling ball that guides a movement member in a relative movement direction while receiving a pressure, and a V-shaped groove.

Japanese Patent Application Publication No. 2019-140764 uses only two rolling balls arranged while being lined up in the relative movement direction, as this rolling ball. However, in the case where only two rolling balls are used, the vibrator or the contact member is unintentionally permitted to rotate about the relative movement direction. For this reason, in Japanese Patent Application Publication No. 2019-140764, a guide bar and a long hole are provided in addition to the rolling balls to restrict the rotation of the contact member about the relative movement direction (refer to paragraphs 0017 and 0036 in Japanese Patent Application Publication No. 2019-140764).

However, the vibration wave motor disclosed in Japanese Patent Application Publication No. 2019-140764 undesirably reduces the downsizing effect acquired due to the use of only two rolling balls according to the addition of a component (the guide bar).

SUMMARY

The present disclosure has been made in consideration of such an issue, and is directed to providing a vibration-type actuator having a smaller size than the conventional technique while restricting rotations of a vibrator and a contact member about a relative movement direction (a predetermined direction) similarly to the conventional technique.

According to an aspect of the present disclosure, a vibration-type actuator includes a vibrator including an elastic member and an electro-mechanical energy conversion element, a contact member configured to contact the elastic member and extending in a predetermined direction, wherein the vibrator and the contact member are relatively driven along the predetermined direction due to a vibration generated by a voltage applied to the electro-mechanical energy conversion element, wherein a first guide extending in the predetermined direction is provided on the contact member, wherein a second guide that is connected with the vibrator is disposed at a position facing the first guide and is configured to move integrally with the vibrator, a ball held between the first guide and the second guide rollably in the predetermined direction, and a base table to which the contact member is fixed, wherein the base table includes a third guide, and wherein the second guide includes a fitting projection portion loosely fitted to a groove portion provided on the third guide and extending in the predetermined direction.

Further features of the present disclosure will become apparent from the following description of exemplary embodiments with reference to the attached drawings.

DESCRIPTION OF THE EMBODIMENTS

Figure 1:
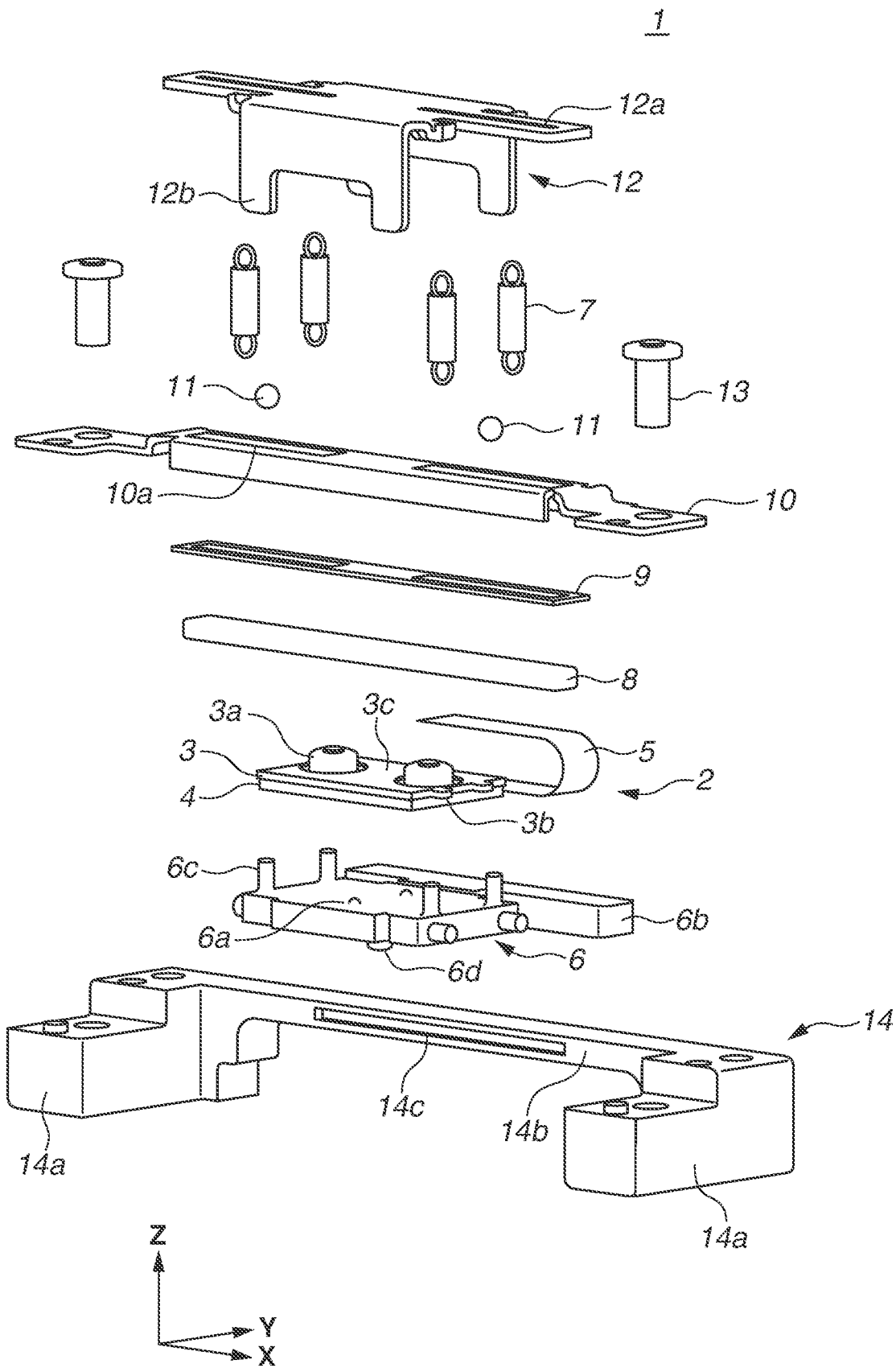
FIG. 1 is an exploded perspective view of a vibration wave motor according to a first exemplary embodiment of the present disclosure.
Figure 2A:
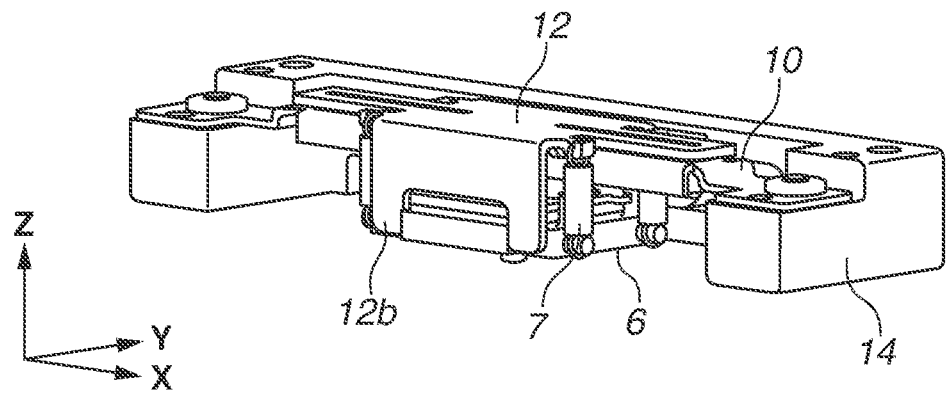
FIGS. 2A, 2B, and 2C are a perspective view, a cross-sectional view taken along a YZ plane, and a cross-sectional view taken along an XZ plane illustrating the vibration wave motor according to the first exemplary embodiment of the present disclosure, respectively.
Figure 2B:
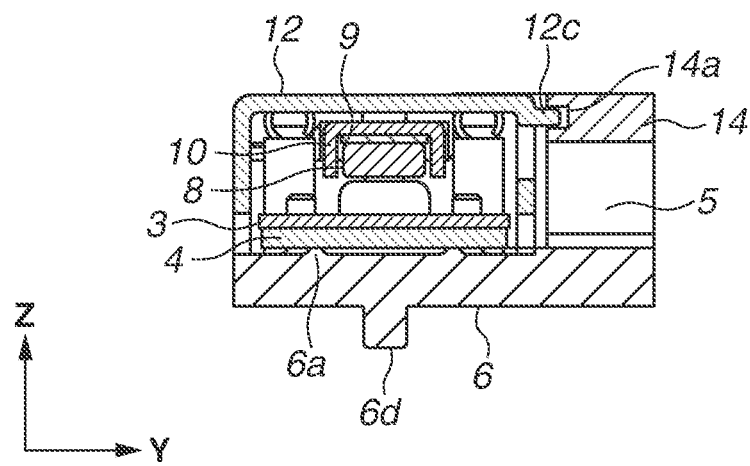
Figure 2C:
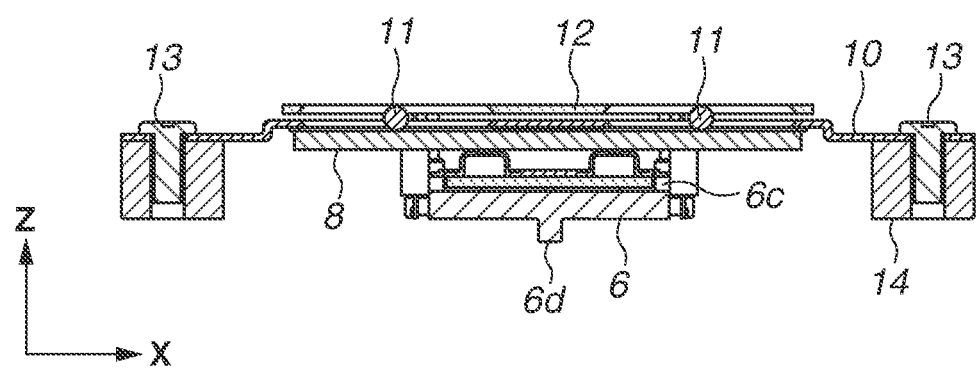

A first exemplary embodiment is an example in which the present disclosure is applied to a (linear) vibration wave motor, and the details thereof will be described with reference to FIGS. 1 and 2A to 2C. First, FIG. 1 is an exploded perspective view of a vibration wave motor 1 according to the first exemplary embodiment of the present disclosure, and FIGS. 2A to 2C are assembly drawings thereof. As will be used herein, an X direction, a Z direction, and a Y direction are defined to refer to a relative movement direction of a vibrator 2 (a predetermined direction), a pressing direction, and a direction perpendicular to the X direction and the Z direction, respectively.

An elastic member 3 includes a rectangular main body portion 3c, and a plurality of extension portions 3b (two positions×two extension portions 3b=four extension portions 3b in the present example) extending from a plurality of positions (two positions in the present example) of the main body portion 3c in the X direction, respectively. The plurality of extension portions 3b (four extension portions 3b in the present example) can also be said to respectively protrude from a plurality of positions (four positions in the present example) of the main body portion 3c that respectively corresponds to different positions of the main body portion 3c in the X direction and different positions of the main body portion 3c in the direction perpendicular to the X direction and the Z direction.

A piezoelectric element 4 serving as an electro-mechanical energy conversion element is fixed to the elastic member 3 with an adhesive or the like and a flexible printed board 5 (a cable) is further fixed to the piezoelectric element 4 on an opposite surface from the elastic member 3, and the vibrator 2 is formed of them. In the method for fixing the piezoelectric element 4 and the flexible printed board 5 (the cable), an anisotropically conductive paste or an anisotropically conductive film that permits electric conduction only in the Z direction is used.

A material that less damps a vibration, such as metal and ceramic, is desirable as the material of the elastic member 3. The elastic member 3 may be manufactured by integrally forming protrusion portions 3a using stamping, cutting, or the like, or can also be manufactured by forming the protrusion portions 3a separately and fixing the protrusion portions 3a thereafter using welding, bonding, or the like. The elastic member 3 may include a plurality of protrusion portions 3a as described in the present exemplary embodiment or may include a single protrusion portion 3a.

The piezoelectric element 4 is formed of lead zirconate titanate. Alternatively, the piezoelectric element 4 may be formed of a piezoelectric material not containing lead, such as barium titanate and bismuth sodium titanate, as a main ingredient thereof. Not-illustrated electrode patterns are formed on the both surfaces of the piezoelectric element 4, and power is supplied from the flexible printed board 5 (the cable).

A node presser 6 (hereinafter referred to as an NP), which is a holding member that presses and holds the vibrator 2, is provided below the vibrator 2. The flexible printed board 5 (the cable) is fixed to a flexible plate 6b of the NP 6 (the holding member) with a two-sided adhesive tape or the like. On the other hand, a frictional member 8 (a contact member), which is one of component members forming the contact member (a part of the contact member), is provided above the vibrator 2. The frictional member 8 is in pressure contact with the protrusion portions 3a of the elastic member 3 in the Z direction due to pressing forces of pressing springs 7 (a pressing member) provided between the NP 6 (the holding member) and a second guide member 12 (a driven guide member). The pressing springs 7 are tensile coil springs, but the coil shapes thereof are cylindrically illustrated for simplification.

An engagement portion 12b is provided on the second guide member 12 (the driven guide member), and is engaged with the NP 6 (the holding member), thereby allowing the second guide member 12 to move integrally with the vibrator 2 in the X direction while permitting the pressing in the Z direction. An output is transmitted outward via an output transmission portion 6d provided on the NP 6 (the holding member).

The contact member 8 is fixed to a first guide member 10 (a fixed guide member), which is one of the component members forming the contact member (a part of the contact member), with the aid of an adhesion force of a rubber 9, which is one of the component members forming the contact member (a part of the contact member). The rubber 9 also plays a vibration damping role of impeding transmission of a vibration from the vibrator 2 to the first guide member 10 (the fixed guide member). The method for fixing the contact member 8, and the first guide member 10 (the fixed guide member) and the rubber 9 may be bonding or screwing. The contact member 8 is made from highly abrasion-resistant metal, ceramic, or resin, or a composite material of highly abrasion-resistant metal, ceramic, or resin.

Especially, a nitrided stainless-steel material such as SUS420J2 is desirable from the perspective of abrasion resistance and mass-productivity. The first guide member 10 (the fixed guide member) is fixed to a base table 14, which is a fixation member, with screws 13.

Figure 3A:
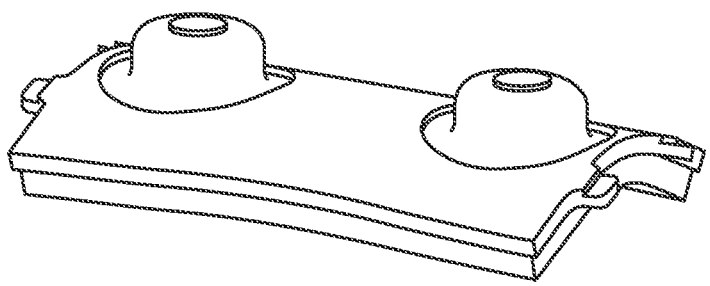
FIGS. 3A and 3B illustrate vibration modes according to the first exemplary embodiment of the present disclosure.
Figure 3B:
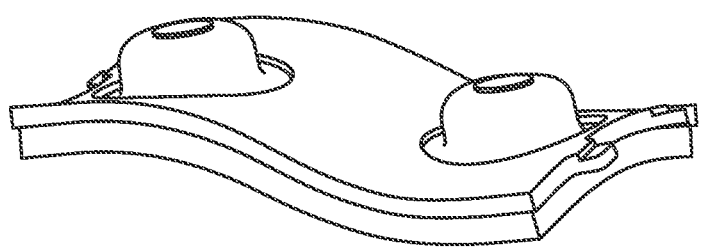

Vibration modes excited in the vibrator 2 will be described with reference to FIGS. 3A and 3B. In the present exemplary embodiment, an alternating-current voltage is applied to the piezoelectric element 4 via the flexible printed board 5, and this excites standing waves (out-of-plane bending vibrations) out of phase with each other in the vibrator 2, thereby generating a vibration as a combination of these out-of-plane bending vibrations.

A mode A, which is a first vibration mode, is a primary out-of-plane bending vibration mode in which two nodes emerge in parallel with the X direction, which is the longitudinal direction of the vibrator 2. The protrusion portions 3a at the two positions are displaced in the Z direction, which is the pressing direction, due to the vibration in the mode A. A mode B, which is a second vibration mode, is a secondary out-of-plane bending vibration mode in which three nodes emerge approximately in parallel with the Y direction, which is the lateral direction of the vibrator 2. The protrusion portions 3a at the two positions are displaced in the X direction due to the vibration in the mode B.

The protrusion portions 3a at the two positions perform an elliptic motion or a circular motion in an XZ plane due to a combination of the vibrations in these modes A and B. The contact member 8 is brought into pressure contact with these protrusion portions 3a, and this generates a frictional force in the X direction and generates a driving force (a thrust force) for relatively moving the vibrator 2 and the contact member 8. In the present exemplary embodiment, the contact member 8 is fixed to the base table 14 as described above, and therefore the vibrator 2 moves in the X direction.

Efficient driving of the vibration wave motor 1 requires supporting the vibrator 2 without impeding the vibrations (displacements) in the two vibration modes excited in the vibrator 2, and the vibrator 2 is desirably supported near the nodes of these two vibration modes to satisfy this requirement. For such a reason, two contact projection portions 6a are provided on a holding portion 6c (a protuberance portion) of the NP 6 (the holding member) to press and hold nodes common between the two vibration modes excited in the vibrator 2. Positioning the vibrator 2 using positioning pins 6c (protuberance portions) provided on the NP 6 (the holding member) allows the two contact projection portions 6a to contact the vicinities of the nodes of the two vibration modes, respectively.

Further, the contact projection portions 6a function to not only press the vibrator 2 but also hold the vibrator 2 in the X direction and the Y direction with the aid of a frictional force. The maximum value of a static frictional force between the contact projection portions 6a and the vibrator 2 is constantly greater than a reaction force received by the vibrator 2 when the contact member 8 is driven, and the vibrator 2 is therefore prevented from moving relative to the NP 6 (the holding member). This effect allows the vibration wave motor 1 to achieve precise driving.

Figure 4:
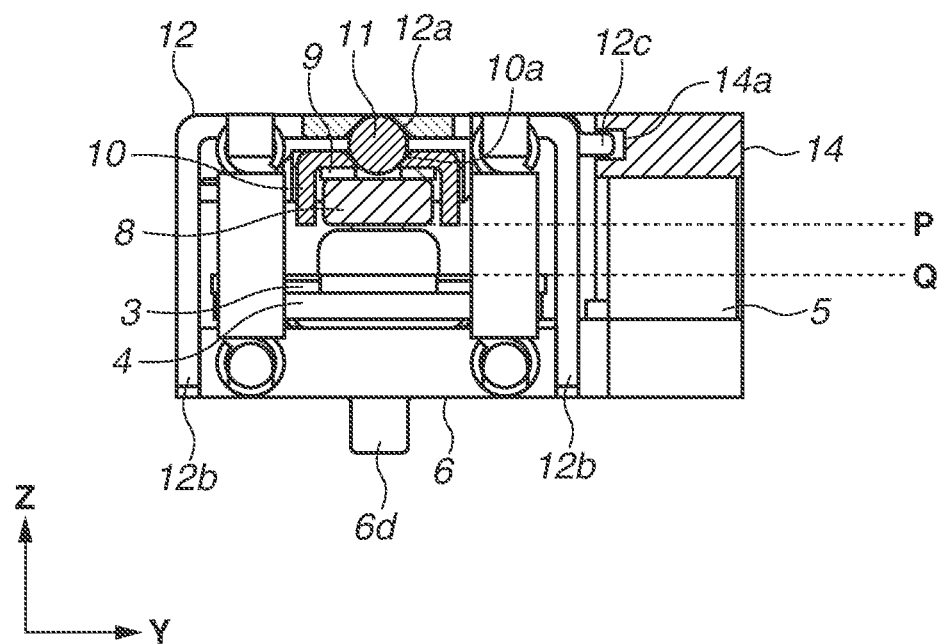
FIG. 4 is a cross-sectional view taken along the YZ plane illustrating a ball and the vicinity thereof in the vibration wave motor according to the first exemplary embodiment of the present disclosure.
Figure 5:
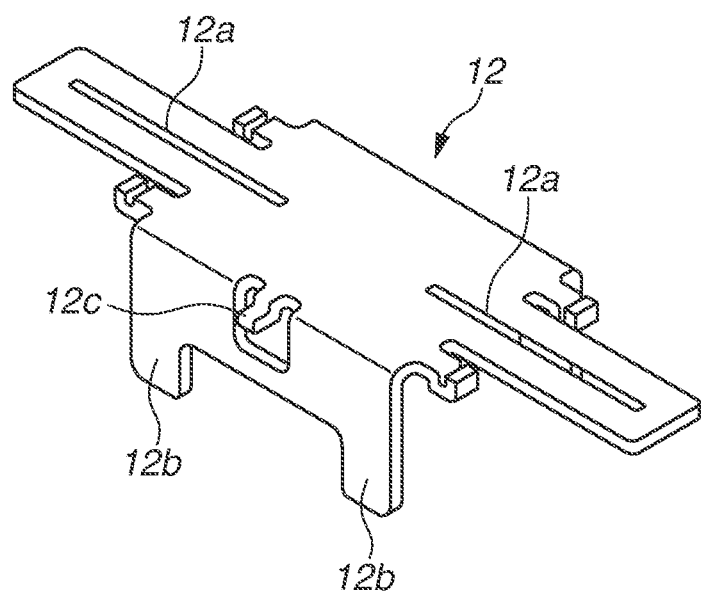
FIG. 5 illustrates a second guide member according to the first exemplary embodiment of the present disclosure.

A guide mechanism according to the present exemplary embodiment will be described with reference to FIG. 4. FIG. 4 is a YZ cross-sectional view centered around a ball 11. Two rolling grooves 10a (a first guide) are provided on the first guide member 10 (the fixed guide member). Two rolling grooves 12a (a second guide) are provided on the second guide member 12 (the driven guide member). Two balls 11 are held between the rolling grooves 10a (the first guide) and the rolling grooves 12a (the second guide) rollably in the relative movement direction (the predetermined direction). This configuration causes the balls 11 to roll in the rolling grooves (the guides) when the vibration wave motor 1 is driven, so that the vibrator 2 and the NP 6 (the holding member), and the second guide member 12 (the driven guide member) can smoothly move in the X direction.

The materials of the first guide member 10 (the fixed guide member) and the second guide member 12 (the driven guide member) are desirably metal, in particular, stainless steel, because of the necessity of being hard enough to be able to receive the pressing at the respective rolling grooves (the guides) and, in addition, from the perspective of workability. A center of pressing by the elastic member 3 (the two protrusion portions 3a) on the contact member 8 is located between the above-described two balls 11 when being viewed from the direction of pressing by the pressing members 7. The center of pressing refers to a point of load of a net force of pressing forces applied to the surface.

Subsequently, a merit brought about by the use of two balls will be described. In a case where the guide unit is formed by three rolling grooves (the guides) and three balls, naturally, the vibration wave motor 1 is enlarged in the Y direction. Two balls should be spaced apart to prevent the pressing force from causing the balls to be separated from the grooves under the influence of the driving reaction force, and using two balls can reduce this distance compared to using three balls and therefore downsizes the vibration wave motor 1 in the X direction.

The vibration wave motor 1 restricts the degree of freedom in the Y direction, the degree of freedom in the Z direction, a rotation about the Y axis, and a rotation about the Z axis while maintaining the degree of freedom in the X direction due to these balls 11, rolling grooves 10a (a first rolling groove), and rolling grooves 12a (a second rolling groove), but permits a rotation about the X axis with the ball 11 placed at the central point thereof.

In light of the above point, in the present exemplary embodiment, this rotation about the X axis is restricted with the aid of loose fitting between a fitting groove 14c (a third guide) provided on the base table 14 and a tilt restriction portion 12c (a fitting projection portion) provided on the second guide member 12, i.e., their fitting with a predetermined backlash formed therebetween. The base table 14 includes two fixation portions 14a equipped with screw holes and positioning pins for fixing the first guide member 10 (the fixed guide member), holes for fixing the base table 14 to outside, and the like, and a connection portion 14b connecting them. The fitting groove 14c (the third guide) is formed at a part of this connection portion 14b along the X direction. The base table 14 is made from resin from the perspective of workability and slidability.

A backlash, i.e., a space is provided between the fitting groove 14c (the third guide) and the tilt restriction portion 12c (the fitting projection portion) to allow the vibration wave motor 1 to be smoothly driven. However, if this space is too large, the vibrator 2 tilts with respect to the contact member 8, and the motor performance is reduced. For this reason, the size of the space in the Z direction between the fitting groove 14c (the third guide) and the tilt restriction portion 12c (the fitting projection portion) is set in such a manner that the angle defined between the surface of the contact member 8 in contact with the vibrator 2 (a broken line P in FIG. 4 and the upper surface of the vibrator 2 (a broken line Q in FIG. 4) does not exceed 2°. A lubricant such as grease is applied to the fitting groove 14c (the third guide) to reduce a loss due to a sliding motion and sliding noise.

The size of the tilt restriction portion 12c (the fitting projection portion) in the X direction is desirably 0.3 mm or larger and 2.0 mm or smaller because the rigidity is lowered if the size is too small while the precision required to the loose fitting is increased if the size is too large.

The flexible printed board 5 (the cable) is fixed to the connection portion 14b. The connection portion 14b also plays a role of accommodating a curved portion of the flexible printed board 5 (the cable), which moves while being curved along with the driving of the vibration wave motor 1. Therefore, the provision of the fitting groove 14c (the third guide) is not accompanied by an addition of a new space. The base table 14 is formed by resin molding, and therefore the addition of the fitting groove 14c (the third guide) is only accompanied by a slight cost increase.

On the other hand, regarding the tilt restriction portion 12c (the fitting projection portion), in the case where the second guide member 12 (the driven guide member) is formed by stamping when being manufactured, the addition of the tilt restriction portion 12c (the fitting projection portion) is also only accompanied by a slight cost increase in this case. In this manner, the present configuration makes it possible to provide a small-sized and stably performable vibration wave motor capable of restricting the rotation about the X axis without impairing the effect of the merit of downsizing the vibration wave motor due to the use of two rolling balls and without requiring an addition of a new component. In other words, the present configuration can provide a vibration-type actuator having a smaller size than the conventional technique while restricting rotations of a vibrator and a contact member about a relative movement direction (a predetermined direction) similarly to the conventional technique. In the vibration wave motor according to the present exemplary embodiment, the configuration of the contact member is not limited to the above-described configuration. The contact member includes the frictional member, the rubber, and the first guide member in the above-described configuration, but they may be integrally formed or may be separately configured. Regardless of whether they are integrally formed or separately configured, the rubber may be omitted from the above-described configuration under a situation that allows a reduction in the vibration damping effect.

In the vibration wave motor according to the present exemplary embodiment, the method for generating the elliptic motion or the circular motion on the contact surface (the driving method) is not limited to the above-described method (driving method). More specifically, this method is not limited to the driving method for generating the elliptic motion or the circular motion on the contact surface using the combination of the vibration mode that displaces the contact surface in the movement direction of the contact member and the vibration mode that displaces the contact surface in the pressing direction. For example, vibrations in bending vibration modes different from the above-described example may be combined with each other. A vibration in a longitudinal vibration mode that extends and compresses the elastic member in the longitudinal direction, and a vibration in a bending vibration mode may be combined with each other.

Any driving method may be employed as long as it has a common node for being pressed and held.

A second exemplary embodiment will be described. The vibration wave motor (the vibration-type actuator) can be used for, for example, the purpose of driving a lens in an imaging apparatus (an optical apparatus or an electronic apparatus). Therefore, the second exemplary embodiment will be described regarding an imaging apparatus (the optical apparatus or the electronic apparatus) using the vibration wave motor (the vibration-type actuator) to drive a lens disposed in a lens barrel as one example. The second exemplary embodiment will be described regarding an imaging apparatus (the optical apparatus or the electronic apparatus) using the vibration wave motor (the vibration-type actuator) to drive an image sensor disposed in a camera main body.

Figure 6A:
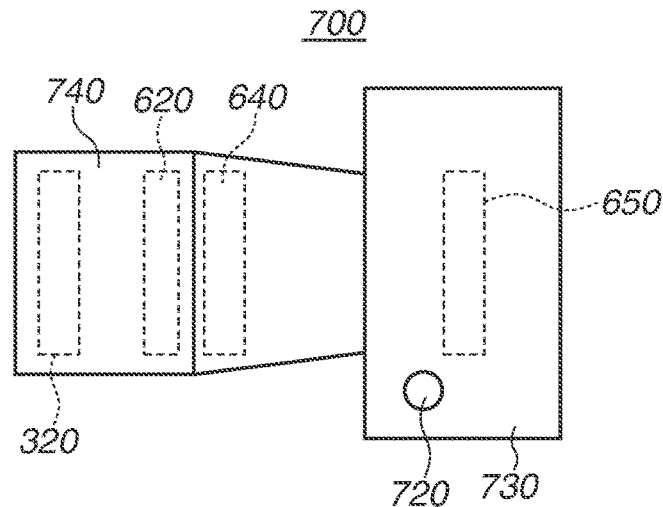
FIGS. 6A and 6B are a top view and a block diagram schematically illustrating the configuration of an imaging apparatus using a vibration wave motor according to a second exemplary embodiment of the present disclosure, respectively.

FIG. 6A is a top view schematically illustrating the configuration of an imaging apparatus 700 (the optical apparatus or the electronic apparatus). The imaging apparatus 700 includes a camera main body 730 (the optical apparatus or the electronic apparatus) equipped with an image sensor 710 and a power button 720. The imaging apparatus 700 includes a lens barrel 740 (the optical apparatus or the electronic apparatus) including a first lens group (not illustrated), a second lens group 320, a third lens group (not illustrated), a fourth lens group 340, and vibration wave motors 620 and 640. The lens barrel 740 is replaceable as an interchangeable lens, and the suitable lens barrel 740 can be attached to the camera main body 730 according to an imaging target. In the imaging apparatus 700, the second lens group 320 and the fourth lens group 340 are driven by the two vibration wave motors 620 and 640, respectively. The image sensor 710 is driven by the vibration wave motor 650. The driving of the second lens group 320, the fourth lens group 340, and the image sensor 710 may be driving of only one of them or only two of them.

The detailed configuration of the vibration wave motor 620 is not illustrated, but the vibration wave motor 620 includes the vibration wave motor (the vibration-type actuator) and a driving circuit of the vibration wave motor (the vibration-type actuator). A rotor 211 is disposed in the lens barrel 740 in such a manner that a radial direction extends substantially perpendicularly to the optical axis. The vibration wave motor 620 moves the second lens group 320 in the optical axis direction by rotating the rotor 211 about the optical axis and converting a rotational output of the contact member into a linear motion in the optical axis direction via a not-illustrated gear and the like. The vibration wave motor 640 moves the fourth lens group 340 in the optical axis direction by being configured similarly to the vibration wave motor 620.

Figure 6B:
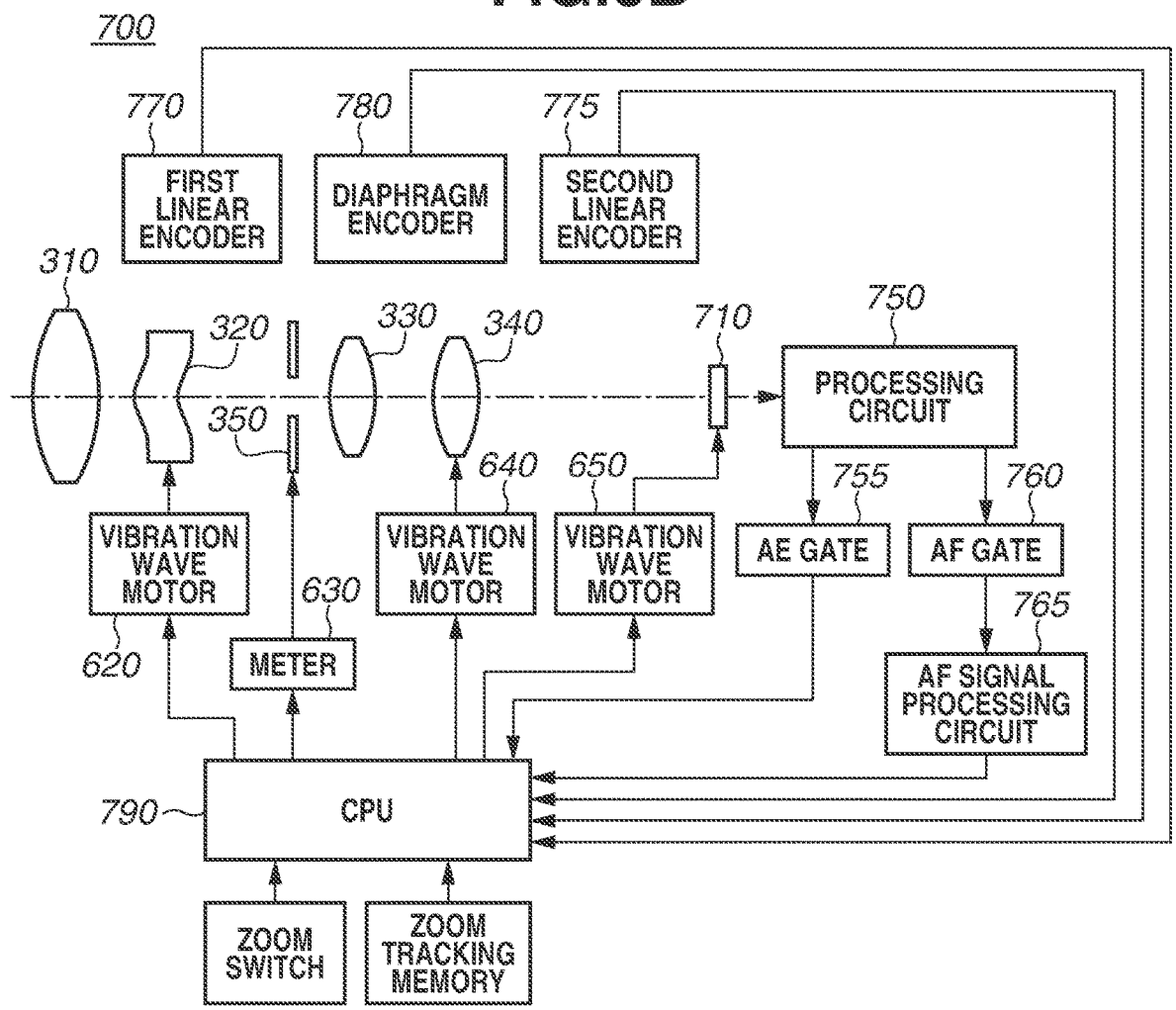

FIG. 6B is a block diagram schematically illustrating the configuration of the imaging apparatus 700. The first lens group 310, the second lens group 320, the third lens group 330, the fourth lens group 340, and a light quantity adjustment unit 350 are disposed at predetermined positions on the optical axis inside the lens barrel 740. Light transmitted through the first lens group 310 to the fourth lens group 340 and the light quantity adjustment unit 350 is imaged on the image sensor 710. The image sensor 710 converts an optical image into an electric signal and outputs the electric signal, and the output electric signal is transmitted to a camera processing circuit 750.

The camera processing circuit 750 performs amplification, a gamma correction, and the like on the output signal from the image sensor 710. The camera processing circuit 750 is connected to a central processing unit (CPU) 790 via an automatic exposure (AE) gate 755, and is also connected to the CPU 790 via an automatic focus (AF) gate 760 and an AF signal processing circuit 765. A video signal subjected to predetermined processing by the camera processing circuit 750 is transmitted to the CPU 790 via the AE gate 755, and via the AF gate 760 and the AF signal processing circuit 765. The AF signal processing circuit 765 extracts a high-frequency component of the video signal, generates an evaluation value signal for automatic focus (AF), and feeds the generated evaluation value to the CPU 790.

The CPU 790 is a control circuit that controls the overall operation of the imaging apparatus 700, and generates a control signal for an exposure determination or a focus adjustment based on the acquired video signal. The CPU 790 adjusts the positions of the second lens group 320, the fourth lens group 340, and the light quantity adjustment unit 350 in the optical axis direction by controlling the driving of the vibration wave motors 620 and 640 and a meter 630, respectively, so as to be able to acquire the determined exposure and the appropriate focus state. The vibration wave motor 620 moves the second lens group 320 in the optical axis direction, the vibration wave motor 640 moves the fourth lens group 340 in the optical axis direction, and the light quantity adjustment unit 350 is driven and controlled by the meter 630 under the control by the CPU 790.

The position of the second lens group 320 driven by the vibration wave motor 620 in the optical axis direction is detected by a first linear encoder 770, and the CPU 790 is notified of a result of the detection, by which this position is fed back to the driving of the vibration wave motor 620. Similarly, the position of the fourth lens group 340 driven by the vibration wave motor 640 in the optical axis direction is detected by a second linear encoder 775, and the CPU 790 is notified of a result of the detection, by which this position is fed back to the driving of the vibration wave motor 640. The position of the light quantity adjustment unit 350 in the optical axis direction is detected by a diaphragm encoder 780, and the CPU 790 is notified of a result of the detection, by which this position is fed back to the driving of the meter 630.

The present configuration can provide a vibration-type actuator having a smaller size than the conventional technique while restricting rotations of a vibrator and a contact member about a relative movement direction (a predetermined direction) similarly to the conventional technique.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-059042, filed Mar. 31, 2021, which is hereby incorporated by reference herein in its entirety.

What is claimed is:

1. A vibration-type actuator comprising:
a vibrator including an elastic member and an electro-mechanical energy conversion element;
a contact member configured to contact the elastic member and extending in a predetermined direction;
wherein the vibrator and the contact member are relatively driven along the predetermined direction due to a vibration generated by a voltage applied to the electro-mechanical energy conversion element;
a first guide member having a first guide extending in the predetermined direction provided on the contact member;
a second guide member having a second guide connected with the vibrator disposed at a position facing the first guide and configured to move integrally with the vibrator;
a ball held between the first guide and the second guide rollably in the predetermined direction; and
a base table to which the contact member is fixed,
wherein the base table includes a third guide having a groove portion extending in the predetermined direction,
wherein the second guide member includes a fitting projection portion fitted within the groove portion such that a space is provided between the groove portion and the fitting projection portion.

2. The vibration-type actuator according to claim 1, further comprising a pressing member configured to press the vibrator and the second guide member, thereby bringing the elastic member and the contact member into pressure contact with each other and also bringing the first guide, the second guide, and the ball into pressure contact with each other.

3. The vibration-type actuator according to claim 2, wherein the first guide and the elastic member overlap each other when viewed from a pressing direction in which the pressing member presses the vibrator and the second guide member, and
wherein a center of pressing by the elastic member on the contact member is located between two balls when viewed from the pressing direction.

4. The vibration-type actuator according to claim 2, wherein the pressing member is a coil spring.

5. The vibration-type actuator according to claim 2, further comprising a cable configured to be used to apply the voltage to the electro-mechanical energy conversion element,
wherein the cable and the third guide overlap each other when viewed from a pressing direction in which the pressing member presses the vibrator and the second guide member.

6. The vibration-type actuator according to claim 5, wherein the cable is a flexible printed board.

7. The vibration-type actuator according to claim 1, wherein a length of the fitting projection portion in the predetermined direction is 0.3 mm or longer and 2.0 mm or shorter.

8. The vibration-type actuator according to claim 1, wherein the vibrator is configured to be driven due to an elliptic motion as the vibration that is generated by the voltage applied to the electro-mechanical energy conversion element.

9. The vibration-type actuator according to claim 1, further comprising a holding member configured to hold the vibrator and including a contact projection portion,
wherein the contact projection portion is configured to contact a portion of the vibrator corresponding to a node common to a plurality of standing waves out of phase with each other as the vibration that is generated by the voltage applied to the electro-mechanical energy conversion element.

10. The vibration-type actuator according to claim 9,
wherein the elastic member includes a main body portion to which the electro-mechanical energy conversion element is fixed, and a plurality of extension portions extending from a plurality of positions of the main body portion in the predetermined direction, respectively,
wherein the holding member includes a plurality of protuberance portions protruding from a plurality of positions in the predetermined direction, respectively, and
wherein the plurality of protuberance portions contacts the main body portion and also contacts the plurality of extension portions, respectively.

11. The vibration-type actuator according to claim 9, wherein the second guide member is configured to be driven together with the vibrator according to the vibration due to engagement between the second guide member and the holding member.

12. The vibration-type actuator according to claim 1, wherein the contact member includes a frictional member configured to contact the elastic member.

13. An optical apparatus comprising:
a lens; and
the vibration-type actuator according to claim 1,
wherein the lens is configured to be driven by the vibration-type actuator.

14. An optical apparatus comprising:
an image sensor; and
the vibration-type actuator according to claim 1,
wherein the image sensor is configured to be driven by the vibration-type actuator.

15. The vibration-type actuator according to claim 1, wherein the fitting projection portion extends from and beyond a surface of the second guide member in a direction perpendicular to the predetermined direction.

16. The vibration-type actuator according to claim 1, wherein a size of the space is selected such that an angle between a surface of the contact member in contact with the vibrator and an upper surface of the vibrator does not exceed 2°.

17. A vibration-type actuator comprising:
a vibrator including an elastic member and an electro-mechanical energy conversion element;
a contact member configured to contact the elastic member and extending in a predetermined direction;
wherein the vibrator and the contact member are relatively driven along the predetermined direction due to a vibration generated by a voltage applied to the electro-mechanical energy conversion element;
a first guide member having a first guide extending in the predetermined direction provided on the contact member;
a second guide member having a second guide connected with the vibrator disposed at a position facing the first guide and configured to move integrally with the vibrator;
a ball held between the first guide and the second guide rollably in the predetermined direction; and a base table to which the contact member is fixed,
wherein the base table includes a third guide,
wherein the second guide member includes a fitting projection portion loosely fitted to a groove portion provided on the third guide and extending in the predetermined direction, and
wherein a length of the fitting projection portion in the predetermined direction is 0.3 mm or longer and 2.0 mm or shorter.

* * * * *